April 20, 1954  G. B. STONE  2,675,905
PORTABLE CONVEYER, INCLUDING ADJUSTABLE SUPPORT
Filed Jan. 23, 1953  2 Sheets-Sheet 1
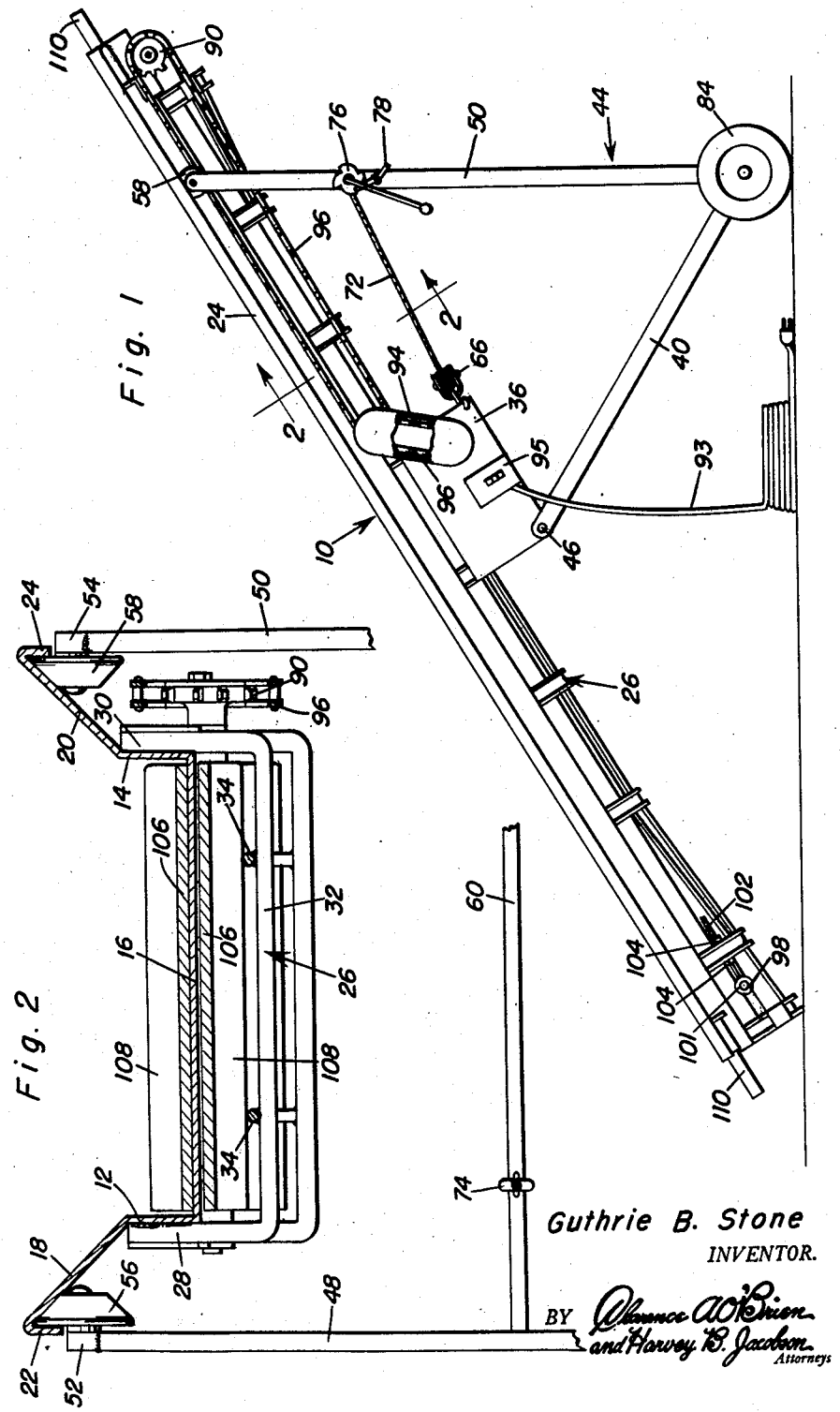
Guthrie B. Stone
INVENTOR.

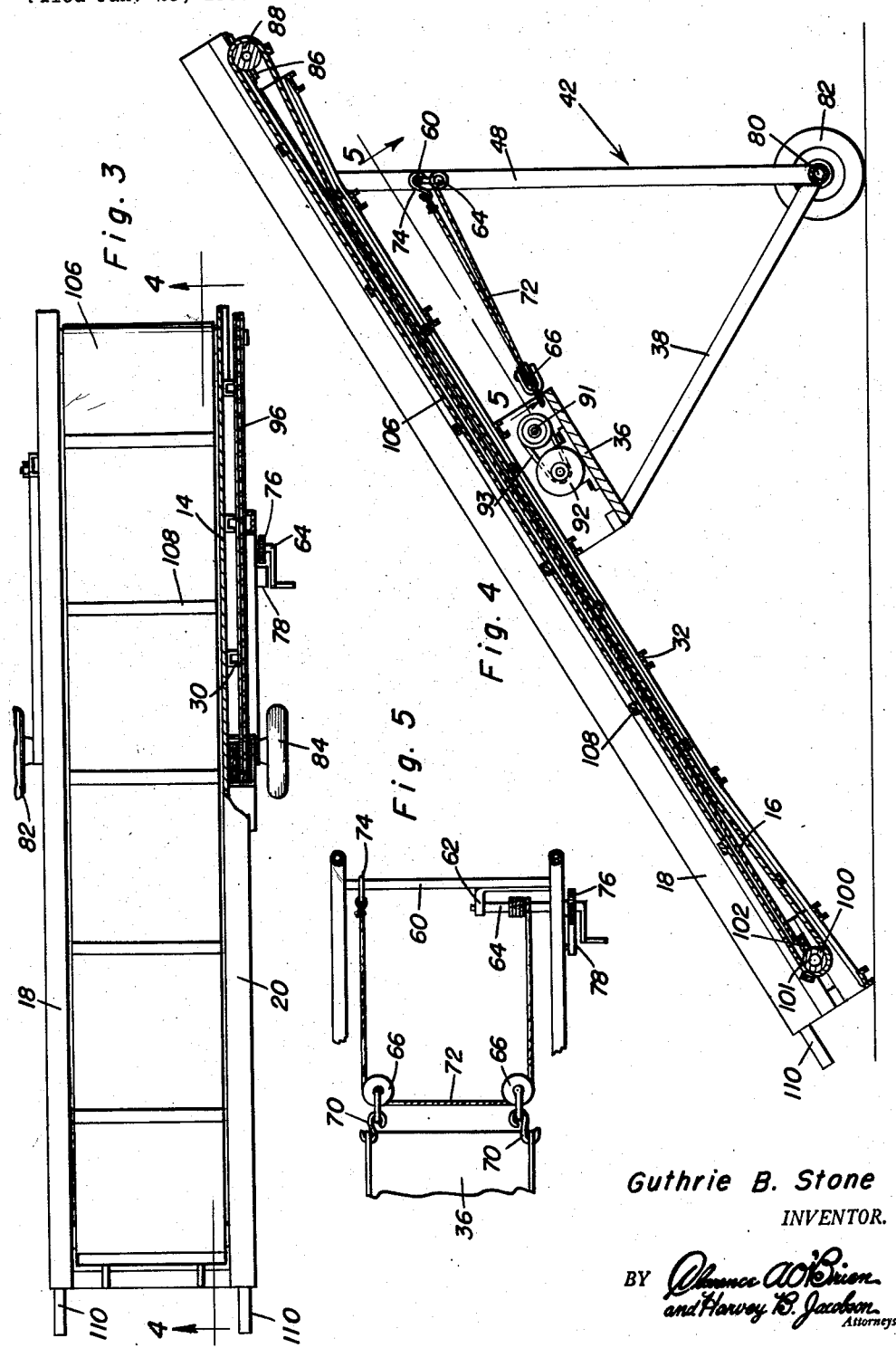

Patented Apr. 20, 1954

2,675,905

UNITED STATES PATENT OFFICE 2,675,905

PORTABLE CONVEYER, INCLUDING ADJUSTABLE SUPPORT

Guthrie B. Stone, Springwater, N. Y.

Application January 23, 1953, Serial No. 332,805

7 Claims. (Cl. 198—121)

This invention relates to new and useful improvements in portable conveyors and the primary object of the present invention is to provide a conveyor including an adjustable wheel support that will retain the conveyor in a predetermined vertically inclined position for the elevating of material from one point to another.

Another important object of the present invention is to provide a portable conveyor including a trough having novel and improved means secured thereto for guiding an endless conveyor belt while preventing sagging of the lower flight of the belt which will extend under the bottom wall of the trough.

A further object of the present invention is to provide a portable elevator conveyor including a vertically swingable support structure and novel and improved means carried by the support structure and engaging side portions of the conveyor trough for guiding the support during its pivotal movement.

A still further aim of the present invention is to provide a portable conveyor that is extremely simple and practical in construction, strong and reliable in use, efficient and durable in operation, inexpensive to manufacture, and otherwise well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the present invention;

Figure 2 is an enlarged transverse sectional view taken substantially on the plane of section line 2—2 of Figure 1;

Figure 3 is a top plan view of Figure 1;

Figure 4 is a longitudinal vertical sectional view taken substantially on the plane of section line 4—4 of Figure 3; and Figure 5 is a detail horizontal sectional view taken substantially on the plane of section line 5—5 of Figure 4.

Referring now to the drawings in detail, wherein for the purpose of illustration, there is disclosed a preferred embodiment of the present invention, the numeral 10 represents an elongated channel shaped trough having spaced side walls 12 and 14 connected by a bottom wall 16. The walls 12 and 14 are provided with upwardly and outwardly projecting extensions 18 and 20 having depending flanges 22 and 24 at their outer portions as shown in Figure 2 of the drawings.

A plurality of longitudinally spaced rigid U-shaped reinforcing and strengthening members 26 are provided for structurally rigidifying the trough 10. The members 26 are channel shaped in cross-section and have spaced limbs 28 and 30 that are fixed by welding or the like to the outer facing of the side walls 12 and 14. The web portions 32 of the members 26 are spaced parallel to and beneath the bottom wall 16 and fixedly support guide rods 34 that extend longitudinally of the trough 10 for a purpose presently to be described.

A substantially U-shaped support 36 is fixed by suitable means to several of the members 26 located at the central portion of the trough 10. The forward leg portions 38 and 40 of a pair of V-shaped wheel supports 42 and 44 are pivotally secured to support 36 by pivot means 46 which may comprise coaxial pins or a single shaft. The rear leg portions 48 and 50 of the supports 42 and 44 fixedly support bearings 52 and 54 for conical rollers 56 and 58. The conical surfaces of the rollers 56 and 58 engage the extensions 18 and 20, and the major end walls of the rollers 56 and 58 engage the inner faces of the flanges 22 and 24, as shown in Figure 2, to guide the supports 42 and 44 as they are moved about the pivot means 46.

The supports 42 and 44 are connected together by a horizontal rod 60 terminally fixed to the leg portions 48 and 50. A U-shaped bearing 62 is fixed to the rod 60 and rotatably supports a crank shaft 64 which includes a part that parallels the rod 60. Pulleys 66 are movably attached to the side walls of the support 36 by S-shaped links 70 and receive a cable 72 having a hook 74 attached to one of its ends that is engaged over rod 60. The other end of cable 72 is fixed to shaft 64 to be wound thereon for moving the rear leg portions 48 and 50 toward the support 36. A ratchet 76 is fixed to the shaft 64 for engagement with a pawl 78 pivoted to leg portion 50 for locking the shaft 64 in a selected rotated position.

The apices of the support members 42 and 44 are connected by a horizontal tubular bar 80 whose ends rotatably support preferably pneumatic ground wheels 82 and 84.

Bearings 86 at the top end of trough 10 rotatably support the shaft of a drive roller 88. Roller 88 extends transversely of trough 10 and fixedly supports a sprocket 90 on one of its ends.

An electric motor 92 mounted on support 36 is connected by a belt drive 93 to a jack shaft 91 journaled on support 36. The shaft 91 carries a sprocket that is connected to sprocket 90 by a sprocket chain 96 in a casing 94.

The lower end of trough 10 slidably supports collars 98 on the ends of a lower idler roller support shaft 101. Threaded rods 102 fixed to the collars 98 extend through apertures in one of the members 26 and receive lock nuts 104 whereby the roller 100 on shaft 101 may be adjusted longitudinally of trough 10.

An endless conveyor belt 106 extends over the rollers 88 and 100. The upper flight of the belt 106 rests upon the bottom wall 16 of the trough 10 and the lower flight of the belt 106 extends under the bottom wall 16. A plurality of spaced parallel transverse cleats 108 are fixed to the belt 106 by suitable means and the cleats on the lower flight of the belt 106 will ride upon the rods 34 (Figure 2) to prevent the lower flight of the belt 106 from sagging and becoming stretched.

Retractable hand grips 110 are fixed to the extensions 18 and 20 at the forward or rear ends of the trough and provide means whereby the device may be wheeled, carried or manipulated in any convenient manner.

In practical use of the present invention, the portable conveyor is moved to a desired location upon the wheels 82, 84 by a user or users grasping the hand grips 110. After the conveyor has been moved to its desired location for use, the ratchet is disengaged from the pawl 78 and the crank shaft 64 is rotated to selectively raise or lower the top end of the trough 10 about the pivot means 46 for the supports 42 and 44. After the trough 10 has been moved to its desired vertically inclined positions, the pawl 78 is then again engaged with ratchet 76 to lock the trough 10 in this position.

Motor 92 is preferably of the electric type and includes a cord 93 and a control switch 95. The cord 93 is inserted into a suitable house outlet and the switch 95 is actuated to complete the circuit to the motor 92 which will drive the roller 88 and cause the endless conveyor belt 106 to move longitudinally of the trough 10.

The cleats 108 disposed on the lower flight of the belt or disposed on the portion of the belt that is extended under the bottom wall 16 will ride upon the guide rods 34 in order to retain the lower flight of the belt relatively close to the bottom wall 16 and thereby prevent sagging of the lower flight of the belt. In order to tighten the endless conveyor belt 106, the nuts 104 are adjusted upon the rods 102 to selectively move the roller 100 forwardly or rearwardly.

It should be noted that the wheel assembly 42, 44 is quickly and readily attached to or removed from the conveyor frame in a convenient manner since the wheel assembly 42, 44 is secured to the conveyor frame by merely two bolts 46. Also the pulleys 66 are easily disconnected from support 36.

The retractable handles 110 on each end of the conveyor frame may be extended, after the wheel assembly is removed, whereby the device may be carried by two men to a desired location for use.

As the cleats 108 ride upon tubular supports 34, there is a minimum of resistance to the movement of the belts 106, thereby prolonging the cleats and permitting smooth movement of the belt.

What is claimed as new is as follows:

1. A portable conveyor comprising an elongated channel shaped trough having side walls provided with upwardly and outwardly projecting extensions, said extensions including upper portions having depending flanges, a pair of side by side V-shaped wheel supports having forward and rear leg portions, means pivotally securing the forward leg portions of said supports to said trough intermediate the ends of the trough, conical rollers carried by the rear leg portions of said supports underlying said extensions and having conical surfaces contacting said extensions and major end walls contacting said flanges, means connecting said rear leg portions to said trough for adjusting the supports about the pivot means for the forward leg portions, and a power driven endless conveyor belt carried by the trough.

2. A portable conveyor comprising an elongated channel shaped trough having side walls provided with upwardly and outwardly projecting extensions, said extensions including upper portions having depending flanges, a pair of side by side V-shaped wheel supports having forward and rear leg portions, means pivotally securing the forward leg portions of said supports to said trough intermediate the ends of the trough, conical rollers carried by the rear leg portions of said supports underlying said extensions and having conical surfaces contacting said extensions and major end walls contacting said flanges, means connecting said rear leg portions to said trough for adjusting the supports about the pivot means for the forward leg portions, a transverse roller at each end of the trough, an endless belt extending over the rollers and having an upper flight overlying the bottom wall of the trough and a lower flight underlying the bottom wall of the trough, and power means operatively connected to one of said rollers for rotating the latter to move the belt.

3. A portable conveyor comprising an elongated channel shaped trough having side walls provided with upwardly and outwardly projecting extensions, said extensions including upper portions having depending flanges, a pair of side by side V-shaped wheel supports having forward and rear leg portions, means pivotally securing the forward leg portions of said supports to said trough intermediate the ends of the trough, conical rollers carried by the rear leg portions of said supports underlying said extensions and having conical surfaces contacting said extensions and major end walls contacting said flanges, means connecting said rear leg portions to said trough for adjusting the supports about the pivot means for the forward leg portions, a transverse roller at each end of the trough, an endless belt extending over the rollers and having an upper flight overlying the bottom wall of the trough and a lower flight underlying the bottom wall of the trough, and power means operatively connected to one of said rollers for rotating the latter to move the belt, a plurality of spaced parallel transverse cleats secured to said belt, a pair of spaced parallel guide rods supported under and parallel to the bottom end of the trough and extending longitudinally of the trough to slidably support the cleats of the lower flight of the belt and thereby prevent said lower flight from sagging below the trough.

4. The combination of claim 3 and a plurality of U-shaped reinforcing and strengthening members having spaced leg portions fixed to said side walls and connecting webs under the bottom wall of the trough and fixed to said guide rods.

5. In a portable conveyor comprising an elongated channel shaped conveyor-belt receiving trough having side walls provided with upwardly and outwardly projecting extensions, said extensions including upper portions having depending flanges, a pair of interconnected V-shaped wheel supports having forward and rear leg portions, support means carried by the trough pivotally supporting the forward leg portions, conical rollers carried by the rear leg portions having conical surfaces riding against said extensions and major end walls riding against said flanges, and means connecting said rear leg portions to said support means for adjusting the support about the pivot means for said forward leg portions.

6. In a portable conveyor comprising an elongated channel shaped conveyor-belt receiving trough having side walls provided with upwardly and outwardly projecting extensions, said extensions including upper portions having depending flanges, a pair of interconnected V-shaped wheel supports having forward and rear leg portions, support means carried by the trough pivotally supporting the forward leg portions, conical rollers carried by the rear leg portions having conical surfaces riding against said extensions and major end walls riding against said flanges, a pair of spaced pulleys carried by said support means, a crank shaft rotatably mounted on said supports, a cable trained over the pulleys and having one end fixed to one of said supports and its other end fixed to the shaft whereby winding of the cable on the shaft will move the rear leg portions of the supports toward the support means, a ratchet fixed to the shaft and a frame pivoted to said one of said supports engageable with the ratchet to lock the shaft in a selected rotated position.

7. The combination of claim 5 and retractable hand grips at the ends of said side walls whereby the trough may be carried when the wheel supports are removed from the trough.

References Cited in the file of this patent

UNITED STATES PATENTS

| Number | Name | Date |
| --- | --- | --- |
| 1,653,226 | Olson | Dec. 20, 1927 |
| 1,873,456 | Morrow | Aug. 23, 1932 |
| 2,425,860 | Brady | Aug. 19, 1947 |
| 2,646,157 | Belt | July 21, 1953 |